United States Patent
Huang et al.

(10) Patent No.: US 9,906,139 B2
(45) Date of Patent: Feb. 27, 2018

(54) POWER SUPPLY MODULE, POWER SUPPLY DEVICE, AND POWER CONTROLLING METHOD

(71) Applicant: Chicony Power Technology Co., Ltd., New Taipei (TW)

(72) Inventors: Wen-Nan Huang, New Taipei (TW); Ching-Guo Chen, New Taipei (TW); Yao-Wen Tsai, New Taipei (TW); Ti-Te Chen, New Taipei (TW); Huan-Chih Chiu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/061,430

(22) Filed: Mar. 4, 2016

(65) Prior Publication Data
US 2017/0257034 A1  Sep. 7, 2017

(51) Int. Cl.
*H02M 3/335* (2006.01)
*H02M 1/42* (2007.01)

(52) U.S. Cl.
CPC ......... *H02M 3/33507* (2013.01); *H02M 1/42* (2013.01)

(58) Field of Classification Search
CPC ......... H02M 3/33507; H02M 3/33523; H02M 1/32; H02M 1/42; Y02B 70/16; Y02B 70/1491
USPC .................. 363/21.01, 21.04–21.18
See application file for complete search history.

(56) References Cited

U.S. PATENT DOCUMENTS

| | | | | |
|---|---|---|---|---|
| 8,233,291 B2* | 7/2012 | Lin | ...................... | H02M 1/4258 363/21.08 |
| 9,350,262 B1* | 5/2016 | Hsiao | ..................... | H02M 7/217 |
| 9,379,580 B2* | 6/2016 | Barkley, Jr. | ............. | H02J 9/062 |
| 2006/0238177 A1* | 10/2006 | Tagliati | .................. | H05B 41/40 323/255 |
| 2015/0349624 A1* | 12/2015 | Wang | .................. | H02M 1/4225 363/21.09 |
| 2017/0048938 A1* | 2/2017 | Lin | ..................... | H05B 33/0815 |

OTHER PUBLICATIONS

Received search report from STIC EIC 2800 searcher John DiGeronimo on Dec. 22, 2016 and Feb. 23, 2017.*

* cited by examiner

*Primary Examiner* — Timothy J Dole
*Assistant Examiner* — Htet Z Kyaw
(74) *Attorney, Agent, or Firm* — Muncy, Geissler, Olds & Lowe, P.C.

(57) ABSTRACT

A power supply module coupled with a primary winding of a power conversion module, the power supply module includes a plurality of power-controlling modules, a plurality of second switches, and a microprocessor. Each power-controlling module includes an auxiliary winding and a first switch electrically connected in series, and each auxiliary winding is magnetic coupled with the primary winding. Each second switch is electrically connected to one of the power-controlling units. The microprocessor is electrically connected to the first switches of the power-controlling modules and the second switches. The microprocessor places at least one first switch and one of the second switches in a conducting state to make the first switch in the conducting state and the second switch in the conducting state electrically connect in series and output an electric power to power the power conversion module.

10 Claims, 3 Drawing Sheets

POWER SUPPLY MODULE, POWER SUPPLY DEVICE, AND POWER CONTROLLING METHOD

BACKGROUND OF THE INVENTION

Field of the Invention

The present disclosure relates to a power supply module. More particularly, the present invention is related to a power controlling method and a power supply module applicable to power supply devices.

Description of Related Art

In general, the electronic products are operated when providing with a suitable and normal electric power, thereby the electronic products may be suffered when the electric power applies abnormally. A power converter is usually arranged between an alternative current (AC) electric power and the electronic product, and is configured to detecting the electric power required by the electronic product and convert the AC electric power to direct current (DC) electric power required by the electric power to power the electronic product.

Specifically, the electronic product can be operated under low power consumption mode (such as standby mode) or high power consumption mode (such as non-standby mode), and when the electronic product is operated under low power consumption mode, the electric power required by the electronic product reduces, thus the electric power provided by the power supply device for powering the electric product is then reduced to meet the requirement of the electronic product. However, the electric power required for the power supply device for powering its components is a constant no matter the electric product is operated under low power consumption mode or high power consumption mode.

SUMMARY OF THE INVENTION

According to one aspect of the present disclosure, a power supply module coupled with a primary winding of a power conversion module, the power supply module includes a plurality of power-controlling modules, a plurality of second switches, and a microprocessor. Each power-controlling module includes an auxiliary winding and a first switch electrically connected in series, and each auxiliary winding is magnetic coupled with the primary winding. Each second switch is electrically connected to one of the power-controlling units. The microprocessor is electrically connected to the first switches of the power-controlling modules and the second switches. The microprocessor places at least one first switch and one of the second switches in a conducting state to make the first switch in the conducting state and the second switch in the conducting state electrically connect in series and output an electric power to power the power conversion module.

According to another aspect of the present disclosure, the power supply device includes a power conversion module and a power supply module. The power conversion module includes a primary winding and a plurality of microcontrollers. The power supply module includes a plurality of power-controlling units, a plurality of second switches, and a microprocessor. Each power-controlling unit includes an auxiliary winding and a first switch electrically connected in series, wherein each auxiliary winding is coupled with the primary winding. Each second switch is electrically connected to one of the power-controlling units. The microprocessor is electrically connected to the first switches and the second switches. The microprocessor places at least one first switch and one of the second switches in a conducting state to make the first switch in the conducting state and the second switch in the conducting state electrically connect in series and output an electric power to power the microcontrollers of the power conversion module according to operation states of the microcontrollers.

According to still another aspect of the present disclosure, a power controlling method used for providing an electric power to power a power supply module of a power supply device comprising a primary winding includes following steps: providing a plurality of auxiliary windings, a plurality of first switches, and a plurality of second switches, the auxiliary windings coupled with the primary winding, each first switch electrically connected to one of the auxiliary windings to form a power-controlling unit, and each second switch electrically connected to one of the power-controlling unit; detecting the electric power for powering the power supply module; and placing at least one of the first switch and one of the second switches in a conducting state, wherein the second switch in the conducting state is electrically connected to the first switch in the conducting state in series.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
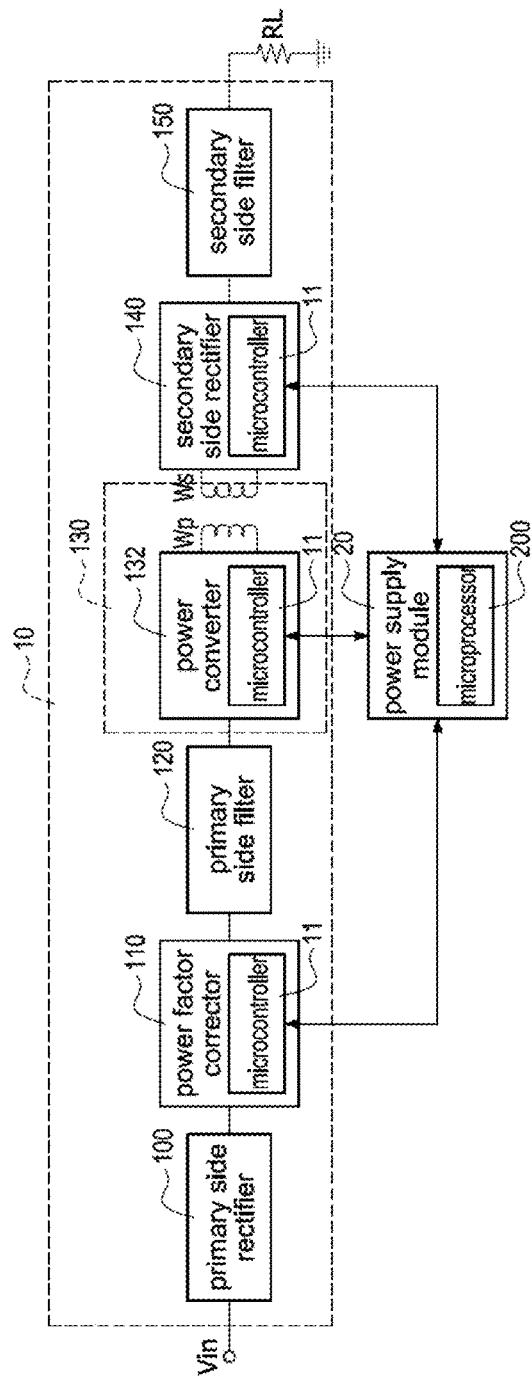
FIG. 1 is a circuit diagram of a power supply device according to the present disclosure.

Reference is made to FIG. 1, which is a circuit block diagram of a power supply device according to the present disclosure. The power supply device (its reference numeral is omitted) includes an input terminal for connecting to a power source Vin, an output terminal for connecting to the load RL, a power conversion module 10, and a power supply module 20. The power supply device receives an electric power (such as an alternative current electric power) provided by the power source Vin and then provides an direct current (DC) electric power to power the load RL. The power conversion module 10 is arranged between the power source Vin and the load RL and electrically connected thereto. The power conversion module 10 receives the AC electric power provided by the power source Vin and converts the AC electric power to the DC electric power that is used to power the load RL. The load RL is, for example, a server or a personal computer (PC). The power supply module 20 is electrically connected to the power conversion module 10 and is configured to provide electric powers to power microcontrollers 11 of the power conversion module 10.

The power conversion module 10 includes a primary winding Wp and a secondary winding Ws coupled with the primary winding Wp, and the turn ratio of the primary winding Wp and the secondary ratio Ws is designated for determining how much electric power (such as voltage and/or current) can be produced at the output terminal.

The power conversion module 10 includes a primary side rectifier 100, a power factor corrector 110, a primary side filter 120, a power converter 130, a secondary side rectifier 140, and a secondary side filter 150. The primary side rectifier 100, the power factor corrector 110, the primary side filter 120, and the power converter 130 are arranged between the power source Vin and the primary winding Wp. The primary side rectifier 100 is, for example, a bridge rectifier, and electrically connected to the power source Vin. The power factor corrector 110 is electrically connected to the primary side rectifier 100. The primary side filter 120 is arranged between the power factor corrector 110 and the primary winding Wp of the power converter 130 and electrically connected thereto. The secondary side rectifier 140 and the secondary side filter 150 are arranged between the secondary winding Ws and the load RL, the secondary side rectifier 140 is connected to the secondary winding Ws, and the secondary side filter 150 is electrically connected to the secondary side rectifier 140 and the load RL. The primary side rectifier receives the AC electric power provided by the power source Vin and rectifies the AC electric power to a full-wave rectified power without power factor correction. The power factor corrector 110 received the full-wave rectified power without power factor correction and ensures that the input current of the rectified power without power factor correction follows voltage of the rectified power without power factor correction in time and amplitude proportionally (i.e. the input voltage and current of the rectified power are maintained in phase relative to each other). The primary side filter 120 filters the noise within the electric power outputted from the power factor corrector 110, and the conducts the filtered electric power to the primary winding Wp. The secondary side rectifier 140 rectifies the electric power outputted from secondary winding Ws into a pulsating DC power, and the secondary side filter 150 filters the ripple of the pulsating DC electric power and then sent a stable DC electric power to the load RL to meet the requirements thereof.

The power conversion module 10 further includes a plurality of microcontrollers 11, and the microprocessors 11 can be arranged within the power factor corrector 110, the power converter 130, and the secondary side rectifier 140. The microprocessors 11 are configured to control operations (such as turn-on and turn-off) of power switches or active components within the power factor corrector 110, the power converter 130, and the secondary side rectifier 140 according to the DC electric power required for the load RL. For example, when the load RL is operated under a high power consumption mode, the power conversion module 10 provides the DC electric power with high power factor to power and drive the load RL, thus microcontroller 11 of the power factor corrector 110 drives the power factor corrector 110 to perform the power factor correcting procedure, and the electric power with high power factor is then provided to the load RL. On the contrary, when the load RL is operated under a low power consumption mode, the power conversion module 10 provides the DC electric power to the load RL to make sure that the load RL is activated or not (i.e. the DC electric power provided by the power supply device is used for detecting whether the load RL is entering from the high power consumption mode from the low power consumption mode or not). Thus the power factor corrector 110 may be inactivated to lower power consumption of the power supply device.

The power supply module 20 is electrically connected to the microcontrollers 11 of the power supply module 10, and provides DC electric power according to the operations of the microcontroller 11.

Figure 2:
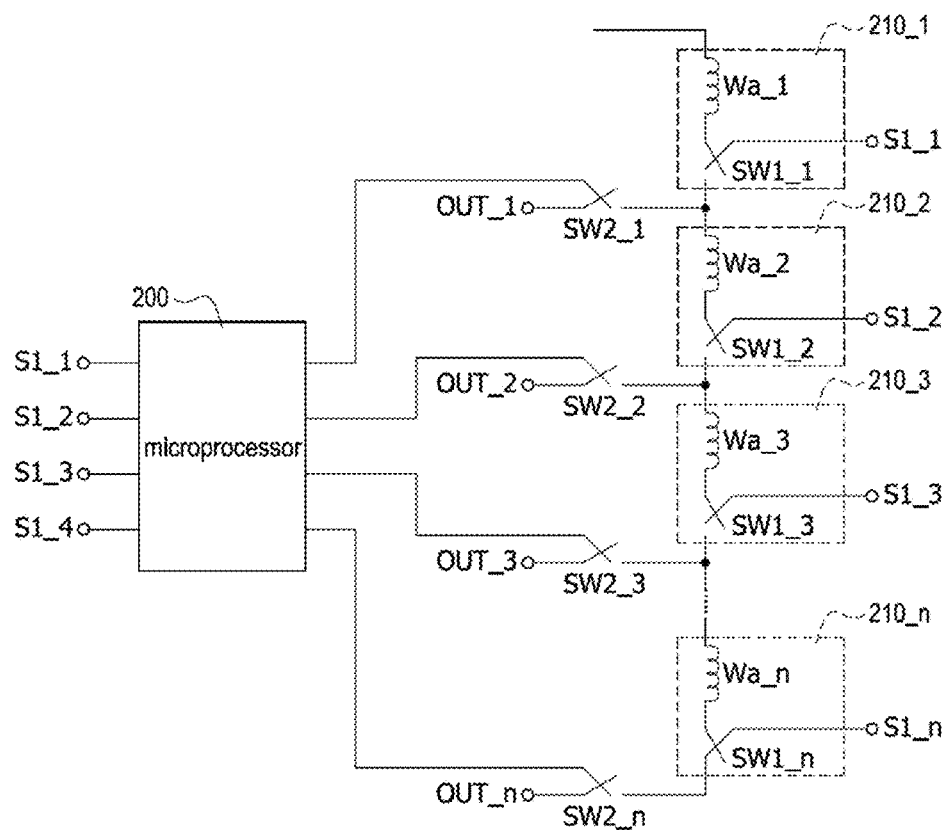
FIG. 2 is a circuit diagram of a power supply module according to the present disclosure.

Reference is made to FIG. 2, which is a circuit diagram of the power supply module according to the present disclosure. The power supply module 20 includes a microprocessor 200, a plurality of auxiliary windings Wa_1~Wa_n, a plurality of first switches SW1_1~SW1_$n$, and a plurality of second switches SW2_1~SW2_$n$. The microprocessor 200 is electrically connected to the first switches SW1_1~SW1_$n$ and the second switches SW2_2~SW2_$n$, and respectively controls the operations (turn-on and turn-off) of the first switches SW1_1~SW1_$n$ and the second switch SW2_1~SW2_$n$ according to the operations of the microprocessors 11, wherein the operations of the microcontroller 11 is in accordance with the operations of the load RL.

The auxiliary winding Wa_1~Wa_n may be designated to have different turn numbers to meet the power requirements of microprocessors 11; however, the auxiliary winding Wa_1~Wa_n may be designated to have the same turn number.

Each first switch SW1_1~SW1_$n$ is electrically connected to one of the auxiliary winding Wa_1~Wa_n in series to form a power-controlling unit 210_1~210_$n$. The first switches SW1_1~SW1_$n$ electrically connected by the microprocessor 200 and driven thereby are, for example, metal-oxide-semiconductor field-effect transistors (MOSFETs).

Each second switch SW2_1~SW2_$n$ is arranged between one of the power-controlling unit 210_1~210_$n$ and one of the output terminal OUT_1~OUT_n, and is placed in a conducting state (turn-on) or a non-conducting state (turn-off) by the microprocessor 200. The second switches SW2_1~SW2_$n$ are, for example, MOSFETs.

Figure 3:
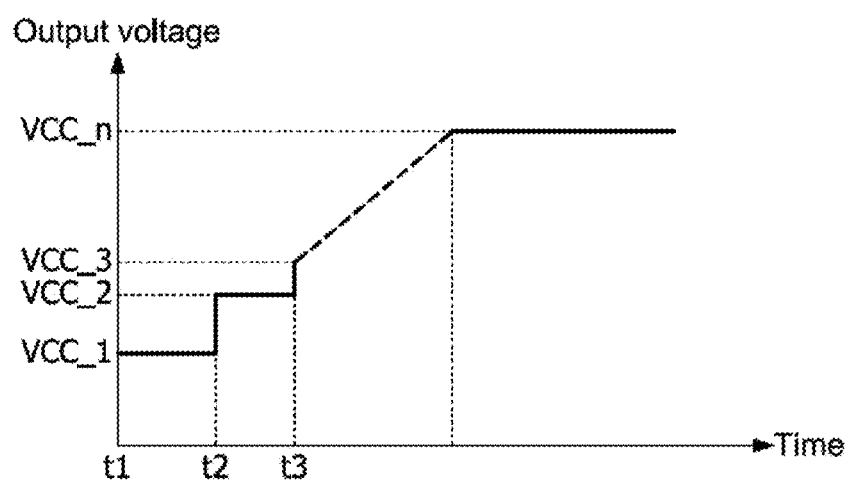
FIG. 3 shows a graph of the relationship between the output voltage and time of the power supply module.

The microprocessor 200 detects the operations of the microcontrollers 11 and places at least one first switch SW1_1~SW1_$n$ and one of the second switch SW2_1~SW2_$n$ in conducting state to provide electric powers to power the microcontrollers 11. The electric powers (the output voltage) provided by the power supply module 20 and conducted to the microcontrollers 11 according to the operations of the microcontrollers 11 are shown in FIG. 3. More particularly, the output voltage provided by the power supply module 20 is direct proportional to the amount of the microcontrollers 11 placed in the conducting state.

Reference is made to FIG. 2 and FIG. 3. In first operation state (as time points between t1 and t2 shown in FIG. 3), a first output voltage Vcc_1 is provided by the power supply module 20. Specifically, in first operation state, the microprocessor 200 places the first switch SW_1 and the second switch SW2_1 in the conducting state, thus the auxiliary winding Wa_1, the first switch SW1_1, and the second switch SW2_1 are electrically connected in series, the auxiliary winding Wa_1 is coupled with the primary winding Wp, and the first output voltage Vcc_1 is generated. The first output voltage Vcc_1 is conducted to the microcontrollers 11 of the power conversion module 10 by the output terminal OUT_1.

When the voltage of the primary winding Wp is Vp, the turn number of the primary winding Wp is Np, and the turn number of the auxiliary winding Wa_1 is $N_{Wa\_1}$, the first output voltage Vcc_1 can write as $$Vcc_1 = \frac{Vp \times N_{W_{a\_1}}}{Np}.$$

In second operation state (as time points between t2 and t3 shown in FIG. 3), a second output voltage Vcc_2 is provided by the power supply module 20. Specifically, in second state, the microprocessor 200 places the first switches SW_1 and SW_2 and the second switch SW2_2 in the conducting state, thus the auxiliary windings Wa_1 and Wa_2, the first switches SW1_1 and SW1_2, and the second switch SW2_2 are electrically connected in series, the auxiliary windings Wa_1 and Wa_2 are coupled with the primary winding Wp and then the second output voltage Vcc_2 is generated. The second output voltage Vcc_2 is conducted to the microcontrollers 11 of the power conversion module 10 by the output terminal OUT_2. It should be noted that the turn number of the auxiliary number Wa_1~Wa_n when the power supply module 20 operated in second operation state (that the auxiliary windings Wa_1 and Wa_2 are coupled with the primary winding Wp) is larger than that of operated in first operation state (that the auxiliary winding Wa_1 is coupled with the primary winding Wp), thus the second output voltage Vcc_2 is higher than the first output voltage Vcc_1.

When the voltage of the primary winding Wp is Vp, the turn number of the primary winding Wp is Np, the turn number of the auxiliary winding Wa_1 is $N_{w_{a\_1}}$, and the turn number of the auxiliary winding Wa_2 is $N_{W_{a\_2}}$, the second output voltage Vcc_2 can write as $$Vcc\_2 = \frac{Vp \times (N_{W_{a\_1}} + N_{W_{a\_2}})}{Np}.$$

In third operation state (as time points between t3 shown in FIG. 3), a third output voltage Vcc_3 is provided by the power supply module 20. Specifically, in third state, the microprocessor 200 places the first switches SW_1~SW_3 and the second switch SW2_3 in the conducting state, thus the auxiliary windings Wa_1~Wa_3, the first switches SW1_1~SW1_3, and the second switch SW2_3 are electrically connected in series, the auxiliary windings Wa_1~Wa_3 are coupled with the primary winding Wp and then the third output voltage Vcc_3 is generated. The third output voltage Vcc_3 is conducted to the microcontrollers 11 of the power conversion module 10 by the output terminal OUT_3. It should be noted that the turn number of the auxiliary number Wa_1~Wa_n when the power supply module 20 operated in third operation state (that the auxiliary windings Wa_1~Wa_3 are coupled with the primary winding Wp) is larger than that of operated in second operation state (that the auxiliary windings Wa_1 and Wa_2 are coupled with the primary winding Wp), thus the third output voltage Vcc_3 is higher than the second output voltage Vcc_2.

When the voltage of the primary winding Wp is Vp, the turn number of the primary winding Wp is Np, the turn number of the auxiliary winding Wa_1 is $N_{W_{a\_1}}$, the turn number of the auxiliary winding Wa_2 is $N_{W_{a\_2}}$, and the turn number of the auxiliary winding Wa_3 is $N_{W_{a\_3}}$, the third output voltage Vcc_3 can write as $$Vcc\_3 = \frac{Vp \times (N_{W_{a\_1}} + N_{W_{a\_2}} + N_{W_{a\_3}})}{Np}.$$

In fourth operation state, an output voltage Vcc_n is provided by the power supply module 20. Specifically, in fourth state, the microprocessor 200 places the first switches SW_1~SW_n and the second switch SW2_n in the conducting state, thus the auxiliary windings Wa_1~Wa_n, the first switches SW1_1~SW1_n, and the second switch SW2_n are electrically connected in series, the auxiliary windings Wa_1~Wa_n are coupled with the primary winding Wp, and then the output voltage Vcc_n is generated. The output voltage Vcc_n is conducted to the microcontrollers 11 of the power conversion module 10 by the output terminal OUT_n.

When the voltage of the primary winding Wp is Vp, the turn number of the primary winding Wp is Np, the turn number of the auxiliary winding Wa_1 is $N_{W_{a\_1}}$, the turn number of the auxiliary winding Wa_2 is $N_{W_{a\_2}}$, the turn number of the auxiliary winding Wa_3 is $N_{W_{a\_3}}$, and the turn number of the auxiliary winding Wa_n is $N_{W_{a\_n}}$, the output voltage Vcc_n can write as $$Vcc\_n = Vp \times \frac{(N_{W_{a\_1}} + N_{W_{a\_2}} + N_{W_{a\_3}} \ldots + N_{W_{a\_n}})}{Np}.$$

According to first to fourth operation states mentioned above, the output voltage of the power supply module 20 is progressively increased when the electric power for powering the power conversion module 10 is gradually increased, and the amount of the switches SW1_1~SW1_n in the conducting state is increased when the output voltage is increased for electrically connecting the auxiliary winding Wa_1~Wa_n connected to the first switches SW1_1~SW1_n in the conducting state in series. The microprocessor 200 of the power supply module 20 is then placed one of the second switches SW2_2~SW2_n in the conducting state to make sure the first switches SW1_1~SW1_n in the conducting state, the second switch SW2_1~SW2_n in the conducting state, and the auxiliary winding Wa_1~Wa_n connected to the first switches SW1_1~SW1_n in the conducting state are electrically connected in series. The auxiliary winding Wa_1~Wa_n connected to the first switches SW_1~SW_n in the conducting state are respectively coupled with the primary winding Wp and then the output voltage is generated and outputted form the one of the output terminals OUT_1~OUT_n to at least one of the microcontrollers 11.

Thus, when the voltage outputted from the power supply module to the power conversion module 10 are Vcc_1~Vcc_n, the voltage of the primary winding Wp is Vp, the turn number of the primary winding Wp is Np, the turn numbers of the auxiliary windings Wa_1~Wa_n are $N_{W_{a\_1}}$~$N_{W_{a\_2}}$, and the signal sent from the microprocessor 200 to the second switches SW2_1~SW2_n are A1~An, the following conditions are satisfied:

$$\begin{bmatrix} Vcc\_1 \\ Vcc\_2 \\ Vcc\_3 \\ \vdots \\ Vcc\_n \end{bmatrix} = \frac{Vp}{Np}[A1 \ A2 \ A3 \ \ldots \ An] \begin{bmatrix} N_{W_{a\_1}} \\ N_{W_{a\_1}} + N_{W_{a\_2}} \\ N_{W_{a\_1}} + N_{W_{a\_2}} + N_{W_{a\_3}} \\ \vdots \\ N_{W_{a\_1}} + N_{W_{a\_2}} + N_{W_{a\_3}} \ldots + N_{W_{a\_n}} \end{bmatrix}.$$

The switch signal sent from the microprocessor 200 to the second switches SW2_1~SW2_n can be logic high signal (1) or logic low signal (0). For example, when A1 gives as 1 and A2~An give as 0, the signal sent from the microprocessor 200 to the second switch SW2_1 is logic high signal and the signals sent form the microprocessor 200 to the second switches SW2_2~SW2_n are logic low signals. Therefore the second switch SW2_1 is placed in the conducting state and the second switch SW2_2~SW2_n are placed in the non-conducting state. When A2 gives as 1, and A1 and A3~An give as 0, the signal sent from the microprocessor 200 to the second switch SW2_2 is logic high signal and the signals sent form the microprocessor 200 to the second switches SW2_1 and SW2_3~SW2_n are logic low signals. Therefore the second switch SW2_2 is placed in the conducting state and the second switch SW1 and SW3_2~SW2_n are placed in the non-conducting state.

To sum up, the power supply module 20 of the present disclosure places at least one first switches SW1_1~SW1_n and one of the second switches SW2_1~SW2_n in the conducting state for providing electric power to power at least one of the microcontroller 11. The second switch SW2_1~SW2_n in the conducting state is electrically connected to the auxiliary winding Wa_1~Wa_n connected to the first switches SW1_1~SW1_n in the conducting state in series. The amount of the first switches SW1_1~SW1_n in the conducting state is direct proportional to the potential level of the electric power generated by the power supply module 20. In the other words, the potential level of the electric power provided by the power supply module 20 is increased when the amount of the first switches SW1_1~SW1_n in the conducting state is increased, and the potential level of the electric power provided by the power supply module 20 is decreased when the amount of the first switches SW1_1~SW1_n in the conducting state is decreased.

The power controlling method of the present disclosure used for providing an electric power to power the power supply device including a primary winding Wp includes the following steps.

At first, a power supply module 20 including a microprocessor 200, a plurality of auxiliary windings Wa_1~Wa_n, a plurality of first switch SW1_1~SW1_n, and a plurality of second switch SW2_1~SW2_n is provided. The auxiliary windings Wa_1~Wa_n are coupled with the primary winding Wp, each first switch SW1_1~SW1_n is electrically connected to one of the auxiliary winding W_1~Wa_n in series to from the power-controlling unit 210_1~210_n, and each second switch SW2_1~SW2_n is electrically connected to one of the power-controlling unit 210_1~210_n. Thereafter, the microprocessor 200 of the power supply module 20 detects the operation state of the microcontrollers 11 with in the power supply device, and places at least one of the first switch SW1_1~SW1_n and one of the second switch SW2_1~SW2_n in a conducting state (i.e. turn on at least one of the first switch SW1_1~SW1_n and one of the second switch SW2_1~SW2_n) to provide an electric power to power the microcontrollers 11 according to the detected result. More particularly, the second switch SW2_1~SW2_n in the conducting state is electrically connected to the first switch(es) SW1_1~SW1_n in the conducting state and the auxiliary winding(s) Wa_1~Wa_n connected to the first switch(es) SW1_1~SW1_n in the conducting state in series, and the auxiliary winding(s) Wa_1~Wa_n are coupled with the primary winding Wp and the electric power for power the power supply device is then generated.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supply module coupled with a primary winding of a power conversion module, the power supply module comprising:
   a plurality of power-controlling modules, each power-controlling module comprising an auxiliary winding and a first switch electrically connected in series, wherein each auxiliary winding is magnetic coupled with the primary winding; and
   a plurality of second switches, each second switch electrically connected to one of the power-controlling units; and
   a microprocessor electrically connected to the first switches of the power-controlling modules and the second switches,
   wherein the microprocessor places at least one first switch and one of the second switches in a conducting state to make the first switch in the conducting state and the second switch in the conducting state electrically connect in series and output an electric power to power the power conversion module.

2. The power supply module of claim 1, wherein the microprocessor places the first switches in the conducting state, and the second switches in the conducting state, and the auxiliary windings connected to the first switches in the conducting state are electrically connected in series.

3. The power supply module of claim 1, wherein a potential level of the electric power provided by the power supply module and an amount of the first switches in the conducting state are in direct proportion.

4. The power supply module of claim 1, wherein when a turn number of the primary winding is Np, a voltage of the primary winding is Vp, turn numbers of the auxiliary windings are $N_{Wa\_1}$~$N_{Wa\_n}$, the signal provided from the microprocessor to the second switches are A1~An, and the output voltages of the power supply module are Vcc_1~Vcc_n, the following conditions is satisfied:

$$\begin{bmatrix} Vcc\_1 \\ Vcc\_2 \\ Vcc\_3 \\ \vdots \\ Vcc\_n \end{bmatrix} = \frac{Vp}{Np} [A1 \; A2 \; A3 \; \ldots \; An] \begin{bmatrix} N_{Wa\_1} \\ N_{Wa\_1} + N_{Wa\_2} \\ N_{Wa\_1} + N_{Wa\_2} + N_{Wa\_3} \\ \vdots \\ N_{Wa\_1} + N_{Wa\_2} + N_{Wa\_3} \ldots + N_{Wa\_n} \end{bmatrix}.$$

5. A power supply device comprising:
   a power conversion module comprising a primary winding and a plurality of microcontrollers; and
   a power supply module comprising:
      a plurality of power-controlling units, each power-controlling unit comprising an auxiliary winding and a first switch electrically connected in series, wherein each auxiliary winding is coupled with the primary winding;
      a plurality of second switches, each second switch electrically connected to one of the power-controlling units; and
      a microprocessor electrically connected to the first switches and the second switches,
      wherein the microprocessor places at least one first switch and one of the second switches in a conducting state to make the first switch in the conducting state and the second switch in the conducting state electrically connect in series and output an electric power to power the microcontrollers of the power conversion module according to operation states of the microcontrollers.

6. The power supply device of claim 5, wherein the microprocessor places the first switches in the conducting state, and the second switches in the conducting state, and the auxiliary windings connected to the first switches in the conducting state are electrically connected in series.

7. The power supply device of claim 5, wherein a potential level of the electric power provided by the power supply module and an amount of the first switches in the conducting state are in direct proportion.

8. The power supply device of claim 5, wherein when a turn number of the primary winding is Np, a voltage of the primary winding is Vp, turn numbers of the auxiliary windings are $N_{Wa\_1} \sim N_{Wa\_n}$, the signal provided from the microprocessor to the second switches are A1~An, and the output voltages of the power supply module are Vcc_1~Vcc_n, the following conditions is satisfied:

$$\begin{bmatrix} Vcc_1 \\ Vcc_2 \\ Vcc_3 \\ \vdots \\ Vcc_n \end{bmatrix} = \frac{Vp}{Np} [A1 \ A2 \ A3 \ \ldots \ An] \begin{bmatrix} N_{Wa_1} \\ N_{Wa_1} + N_{Wa_2} \\ N_{Wa_1} + N_{Wa_2} + N_{Wa_3} \\ \vdots \\ N_{Wa\_1} + N_{Wa\_2} + N_{Wa\_3} \ldots + N_{Wa\_n} \end{bmatrix}.$$

9. The power supply device of claim 5, wherein the power conversion module further comprises:
a primary side rectifier;
a power factor corrector arranged between the primary side rectifier and the primary winding and electrically connected to the primary side rectifier and the primary winding, the power factor corrector comprising the microcontroller;
a secondary winding magnetic coupled with the primary winging; and
a secondary side rectifier electrically connected to the secondary winging and comprising the microprocessor.

10. A power controlling method used for providing an electric power to power a power supply module of a power supply device comprising a primary winding, the method comprising:
providing a plurality of auxiliary windings, a plurality of first switches, and a plurality of second switches, the auxiliary windings coupled with the primary winding, each first switch electrically connected to one of the auxiliary windings to form a power-controlling unit, and each second switch electrically connected to one of the power-controlling unit;
detecting the electric power for powering the power supply module; and
placing at least one of the first switches switch and one of the second switches in a conducting state, wherein the second switch in the conducting state is electrically connected to the first switch in the conducting state in series.

* * * * *